United States Patent
Harding (10) Patent No.: US 9,747,693 B1
(45) Date of Patent: Aug. 29, 2017

(54) OBJECT IDENTIFICATION

(71) Applicant: Bonanza.com, LLC, Seattle, WA (US)

(72) Inventor: William Harding, Seattle, WA (US)

(*) Notice: Subject to any disclaimer, the term of this patent is extended or adjusted under 35 U.S.C. 154(b) by 0 days.

(21) Appl. No.: 14/882,274

(22) Filed: Oct. 13, 2015

Related U.S. Application Data (63) Continuation-in-part of application No. 14/791,421, filed on Jul. 4, 2015, now abandoned.

(60) Provisional application No. 62/028,554, filed on Jul. 24, 2014.

(51) Int. Cl.
*G06K 9/34* (2006.01)
*G06T 7/00* (2017.01)
*G06T 7/40* (2017.01)

(52) U.S. Cl.
CPC ............ *G06T 7/0051* (2013.01); *G06T 7/401* (2013.01); *G06T 7/408* (2013.01); *G06T 2207/20148* (2013.01)

(58) Field of Classification Search
CPC ......... G06T 2207/10024; G06T 7/0083; G06T 7/0087; G06T 7/73; G06T 1/0007; G06T 7/246; G06T 7/13; G06T 7/50; G06K 9/4638; G06K 9/4671; G06K 9/78; G06K 9/00664; G06K 9/00624; G06K 9/6202; G06K 9/00201
USPC .................................................. 382/162, 173
See application file for complete search history.

(56) References Cited

U.S. PATENT DOCUMENTS

| | | | | |
|---|---|---|---|---|
| 7,995,845 | B2* | 8/2011 | Forutanpour | G06K 9/4609 348/221.1 |
| 8,983,142 | B1* | 3/2015 | Zhang | G06F 17/30873 382/111 |
| 9,042,648 | B2* | 5/2015 | Wang | G06T 7/0083 382/118 |
| 9,076,029 | B2* | 7/2015 | Free | G06K 9/00228 |
| 2008/0075385 | A1* | 3/2008 | David | G06K 9/40 382/275 |
| 2009/0315712 | A1* | 12/2009 | Bloemendaal | G08B 13/1672 340/541 |
| 2011/0085697 | A1* | 4/2011 | Clippard | G06K 9/4652 382/100 |

* cited by examiner

*Primary Examiner* — Kanjibhai Patel (57) ABSTRACT

A system for identifying objects within an image. Disclosed are methods and systems for an image processing system to segment digital images. Generally stated, certain embodiments implement operations for consolidating shapes in a digital image, including: performing a shape identification analysis of pixels within the digital image to identify shapes within the digital image; analyzing each shape to identify attributes of each shape; comparing the identified attributes of each shape to the identified attributes of other shapes to determine if the shapes are sufficiently related to constitute an object; and if the identified attributes are sufficiently related, associating the shapes with each other to form an object.

18 Claims, 6 Drawing Sheets

OBJECT IDENTIFICATION

CROSS REFERENCE TO RELATED APPLICATIONS

This patent application claims the benefit of and priority to U.S. Provisional Patent Application Ser. No. 62/028,554, filed on Jul. 24, 2014, titled "Background Burner," the disclosure of which is hereby incorporated by reference for all purposes. This patent application is a continuation-in-part of U.S. patent application Ser. No. 14/791,421, entitled "Shape Consolidation," and filed on Jul. 4, 2015, the disclosure of which is hereby incorporated by reference for all purposes.

BACKGROUND INFORMATION

For many years, image scientists and mathematicians have struggled with the problem of how to segment objects within a static two-dimensional image. Currently, the best options that exist to accomplish this are to use a "green screen" (a background of uniform color) to create a drastic distinction between subject objects and background, or a "motion scene" where a subject is separated from background by the nature of its movement. However, those solutions suffer from several problems. For instance, the green screen solution requires substantial effort to implement at the time the image is captured. In addition, the green screen option is useless for images that were captured without use of the green screen. Likewise, the motion scene option is of little to no value for still images. These and other shortcomings render the existing solutions inadequate. Improvements are needed in the area of segmenting objects within an image.

SUMMARY OF THE DISCLOSURE

Embodiments are directed to an image processing system for segmenting digital images. Generally stated, certain embodiments perform operations for consolidating shapes in a digital image, including: performing a shape identification analysis of pixels within the digital image to identify shapes within the digital image; analyzing each shape to identify attributes of each shape; comparing the identified attributes of each shape to the identified attributes of other shapes to determine if the shapes are sufficiently related to constitute an object; and if the identified attributes are sufficiently related, associating the shapes with each other to form an object.

Generally stated, other embodiments implement a system for consolidating shapes in a digital image, including: a computer data store containing the digital image, the digital image being composed of a multiplicity of pixels; and a computing processor, coupled to the computer data store, the computing processor being programmed to perform, in no particular order, operations including to: perform a shape identification analysis of the multiplicity of pixels within the digital image to identify shapes within the digital image; analyze each shape to identify attributes of each shape; compare the identified attributes of each shape to the identified attributes of other shapes to determine if the shapes are sufficiently related to constitute an object; and if the identified attributes are sufficiently related, associate the shapes with each other to form an object.

BRIEF DESCRIPTION OF THE DRAWINGS

Many advantages of the disclosure will become more readily appreciated as the same becomes better understood with reference to the following detailed description, when taken in conjunction with the accompanying drawings, briefly described here.

Embodiments are described below in detail with reference to these Figures, in which like numerals refer to like elements throughout the several drawings and views.

DESCRIPTION OF EMBODIMENTS

Various embodiments are described more fully below with reference to the accompanying drawings, which form a part hereof, and which show specific exemplary implementations for practicing various embodiments. However, other embodiments may be implemented in many different forms and should not be construed as limited to the embodiments set forth herein; rather, these embodiments are provided so that this disclosure will satisfy formal statutory requirements. Embodiments may be practiced as methods, systems or devices. Accordingly, embodiments may take the form of a hardware implementation, an entirely software implementation, or an implementation combining software and hardware aspects. The following detailed description is, therefore, not to be taken in a limiting sense.

The logical operations of the various embodiments are implemented (1) as a sequence of computer implemented steps running on a computing system and/or (2) as interconnected machine modules within the computing system. The implementation is a matter of choice dependent on various considerations, such as performance requirements of the computing system implementing the embodiment. Accordingly, the logical operations making up the embodiments described herein may be referred to alternatively as operations, steps or modules.

This disclosure is structured as follows: First, embodiments will be described as implemented in a sample system. This sample system may be implemented using common or special purpose computing equipment programmed in accordance with the teachings of this disclosure. Next, embodiments will be described as implemented in one or more methods for better segmenting objects within an image. Examples are provided to illustrate how the system and methods may be implemented in practice.

GLOSSARY

Before describing specific embodiments, a general glossary is presented to identify certain terms that will be used throughout this disclosure. Accordingly, the following terms and concepts have the following meanings when used throughout this document.

An "image" is a representation of a real-world scene. A photograph is one example of an image. Images that have either been converted to or captured originally in digital format are referred to as "digital images." The term "image" may be used generically in this document to refer to both digital images and non-digital images.

A "digital image" is made up of a number of pixels, where each pixel represents a point in the scene that is being represented. Digital images are commonly described in terms of their resolution (e.g., 1024×768, YYY×YYY, etc.). The resolution typically refers to the number of pixels that make up the image.

An "edge" is a curve that follows a path of rapid change in image intensity within an image. Edges are often associated with the boundaries of objects in a scene. Edge detection is used to identify edges of objects in an image.

A "shape" is a collection of related pixels. A shape has many characteristics: It is completely enclosed, meaning that it has an edge that encloses and defines an area. The shape has a circumference, which is the length of the edge. The pixels within the area each have a color, which could also be black and white or shades of gray. The shape also has a color that may be defined as the average color value of the shape's constituent pixels. The color of a shape is rarely identical among the pixels that make up the shape. Accordingly, there is typically a gradient, or amount of deviation of color, among the several pixels.

An "object" is a group of one or more related shapes. An object has the characteristics of a shape, and may also have certain additional characteristics. For example, an object may have a center of gravity. Conceptually, an object within an image corresponds loosely to a physically independent object in the real world. For instance, a shirt in an image may be composed of several shapes, depending on variables such as lighting and the pattern of the shirt. However, the shirt may be one object within the scene. However, an object need not be the smallest physically-independent element within an image. For instance, a person within an image may be identified as an object even though the person is composed of other objects (e.g., a shirt, pants, face, etc.).

Generally stated, an image is a collection of pixels that each have attributes, and when the pixels are viewed together, the image creates a scene. Related pixels form a shape, and related shapes make an object. Segmenting the image is the process of identifying one or more shapes and/or objects within the image.

Illustrative System for Object Identification

What follows is a technical description of a system that can take an arbitrary two-dimensional (2D) image and segment the image into one or more shapes and/or objects. The uses for the technology are numerous, including, for example, improved e-commerce photography. Industry professionals frequently pay large sums of money to create an image studio that allows them to take crisp pictures with a white background. If the same results were possible for an amateur using a mobile phone camera, that would greatly simplify the effort expended and reduce the cost for amateurs to engage in e-commerce, such as online-auction selling.

Figure 1:
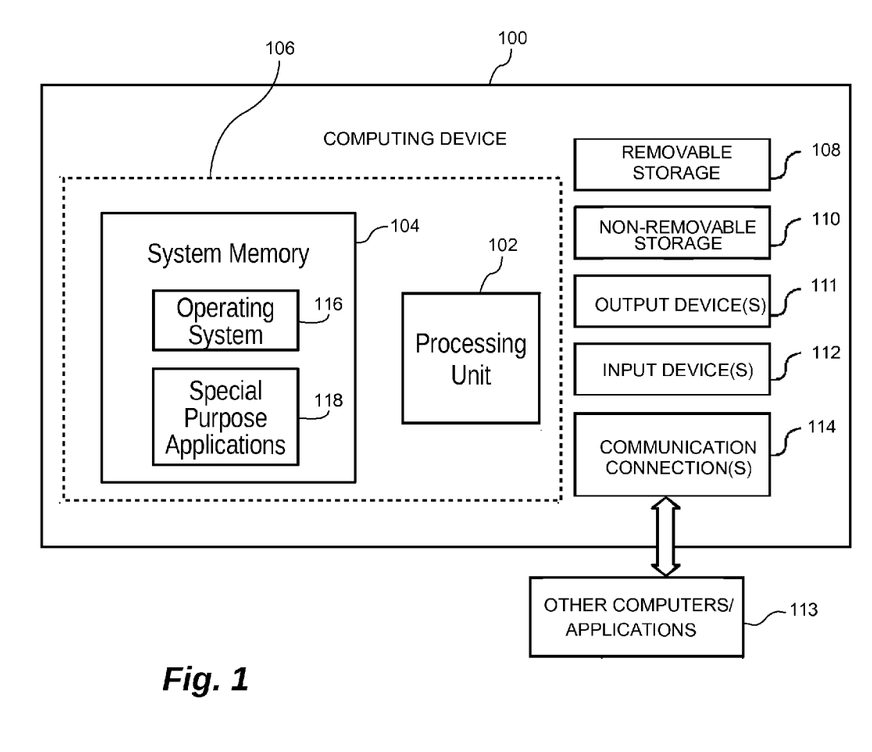
FIG. 1 is a functional block diagram of an exemplary computing device 100 that may be used to implement one or more embodiments.

FIG. 1 is a functional block diagram of an exemplary computing device 100 that may be used to implement one or more embodiments. The computing device 100, in one basic configuration, includes at least a processor 102 and a memory 104. Depending on the exact configuration and type of computing device, memory 104 may be volatile (such as RAM), non-volatile (such as ROM, flash memory, etc.), or some combination of the two. This basic configuration is illustrated in FIG. 1 by dashed line 106.

Figure 3:
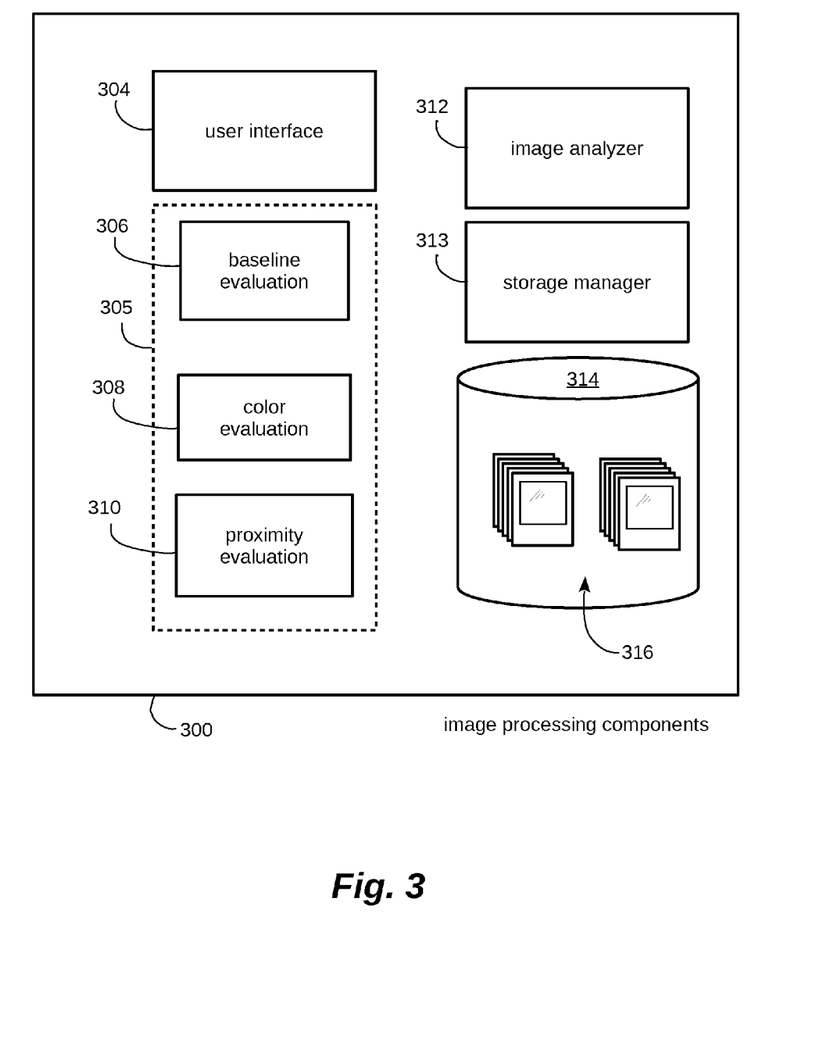
FIG. 3 is a functional block diagram generally illustrating image processing components 300 which may implement the preferred embodiment.

Memory 104 includes at least an operating system 116 and may additionally include other special purpose components 118. The operating system 116 includes core functionality to enable the computing device 100 to operate, such as a file system, memory management, and a graphical user interface. The special purpose components 118 may include any one or more additional components to implement functionality on the computing device 100. Examples of special purpose components 118 are numerous, and include word processing components, spreadsheet components, web browsing components, image processing components, and the like. One particular example of a special purpose component to implement functionality of the preferred embodiment is illustrated in FIG. 3 and described below.

Device 100 may have other features and functionality in addition to the basic components just described. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Computing device 100 includes one or more communication connections 114 that allow computing device 100 to communicate with one or more computers and/or applications 113. The communication connections 114 may take the form of an Ethernet interface, WiFi interface, Bluetooth interface, USB connection, eSATA connection, mobile network radio, or the like. Device 100 may also have input device(s) 112 such as a keyboard, mouse, digitizer or other touch-input device, voice input device, digital camera, or the like. Output device(s) 111 such as a monitor, speakers, printer, PDA, mobile phone, and other types of digital display devices may also be included. These devices are well known in the art and need not be discussed at length here.

Specific instances of computing device 100 may include a desktop computer, a laptop computer, a netbook computer, an ultrabook computer, a server computer, a tablet computer, and a mobile device, such as a cellular phone or other portable computing device.

Figure 2:
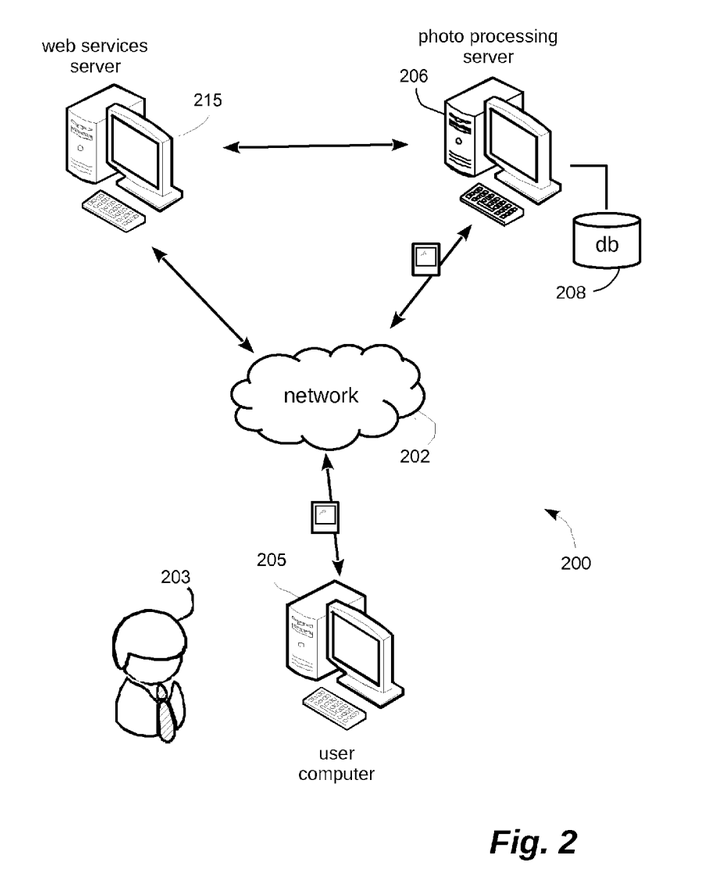
FIG. 2 is a graphical illustration of a computing environment 201 in which embodiments of the invention may be implemented.

FIG. 2 is a graphical illustration of a computing environment 201 in which embodiments of the invention may be implemented. The computing environment 200 may be implemented using appropriate computing devices, such as the computing device illustrated in FIG. 1 and described above, configured in accordance with the teachings of this disclosure. Specific functionality that may be distributed over one or more of the computing devices illustrated in FIG. 2 will be described in detail in conjunction with FIGS. 3-13. However, as an overview, the general operations performed by one embodiment will be described here in conjunction with FIG. 2.

The preferred computing environment 200 includes a user computer 205 and an image processing server 206 connected over a network 202. The network 202 can be any electrical components and supporting software and firmware for interconnecting two or more disparate computing devices. Examples of the network 202 include a local area network, a wide area network, a metro area network, the Internet, a mobile data network, and the like.

In this implementation, the user computer 205 represents a computing device, such as the computing device illustrated in FIG. 1, that an entity (user 203) uses to capture digital images, or to perform operations on digital images, or both. The user computer 205 may incorporate a digital camera for capturing digital images, a scanner for digitizing existing photographs, or a connection for receiving digital images, such as from a portable digital camera (which can be a mobile phone that incorporates a digital camera). In addition, the user computer 205 may be used to connect to other computing devices over the network 202. Although illustrated as a human being, it should be noted that the user 203 could be any form of entity or agent capable of performing computer searches or information retrieval, such as another automated system. In one specific implementation, the user computer 205 is a mobile device, such as a smartphone or tablet, that includes a digital camera. In another specific implementation, the user computer 205 is a traditional desktop or laptop computer.

An image processing server 206 is a computing device, such as the computing device illustrated in FIG. 1, that includes components for processing digital images to attempt to segment shapes and/or objects within an image. Generally stated, the user computer 205 presents a digital image to the image processing server 206 which in turn analyzes the digital image to identify shapes and/or objects within the digital image. In one embodiment, such analysis may involve some interaction with the user 203 to assist in the analysis. The operations and analysis are described in greater detail below.

A web services server 215 may also be included in the computing environment 200. The web services server 215 of this embodiment may implement a service that assists users to advertise products for sale, such as through an online auction or the like. In one specific example, the web services server 215 may enable users to upload images of products which the users desire to offer for sale. The web services server 215 may then facilitate advertising those products through one or more online catalogs of products which various other visitors may browse and search over the network 202. The web services server 215 may additionally, or alternatively, conduct operations to list the users' products with other, third-party online auctions or online storefronts.

Although illustrated as separate computing devices, it should be appreciated that the various functions and components of the several computing devices shown in FIG. 2 could be implemented in ways other than as shown. For example, the image processing components of the image processing server 206 could be either in part or in whole resident on the user computer 205. In one such implementation, the user computer 205 may connect to the image processing server 206 and those image processing components could be downloaded to the user computer 205 at which they are used. Alternatively, the image processing components could be pre-installed on the user computer 205.

Similarly, the web services server 215 may operate in conjunction with the image processing server 206 to provide a web service to the user 203 while also offering the image processing service of the image processing server 206. Alternatively, the image processing components of the image processing server 206 could be resident on the web services server 215. These and other alternatives will be apparent to those skilled in the art.

FIG. 3 is a functional block diagram generally illustrating image processing components 300 which may implement the preferred embodiment. The illustrated components are merely examples, and other components may be implemented which combine, divide, or eliminate certain functions without deviating from the spirit and scope of the disclosure.

The image processing components 300 include a user interface 304 and an object analysis engine 305. In this embodiment, the user interface 304 enables a remote computing device, such as user computer 205, to interact with or control the several image processing components 300. The object analysis engine 305 provides functionality to enable identifying objects within a digital image. Generally stated, the object analysis engine 305 performs one or more analyses on a digital image that includes a number of shapes that have been identified using a shape identification technique. One example of a technique that may be used is described in co-pending patent application Ser. No. 14/791,421 entitled "Shape Consolidation" and filed on Jul. 4, 2015, although any other technique for identifying shapes within a digital image may alternatively be employed. The shape identification function identifies unique shapes within the digital image wherein each shape corresponds to a best guess at distinguishable items within the digital image. For instance, a Canny algorithm is one well known technique that may be implemented in the shape identification function. Another example uses a differential approach to evaluate a rate of change of color across pixels in an image to detect edges. These and many other techniques may be employed in various embodiments.

Figure 5:
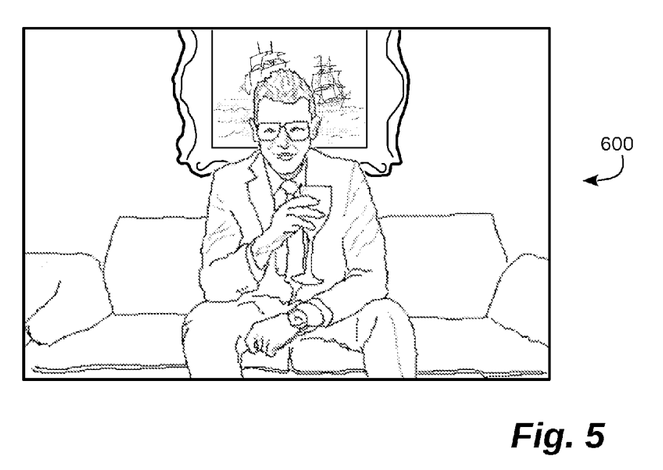
FIGS. 5-7 are illustrative examples of one or more images at various stages during the performance of the steps of the process illustrated in FIG. 4, in accordance with various embodiments.
Figure 6:
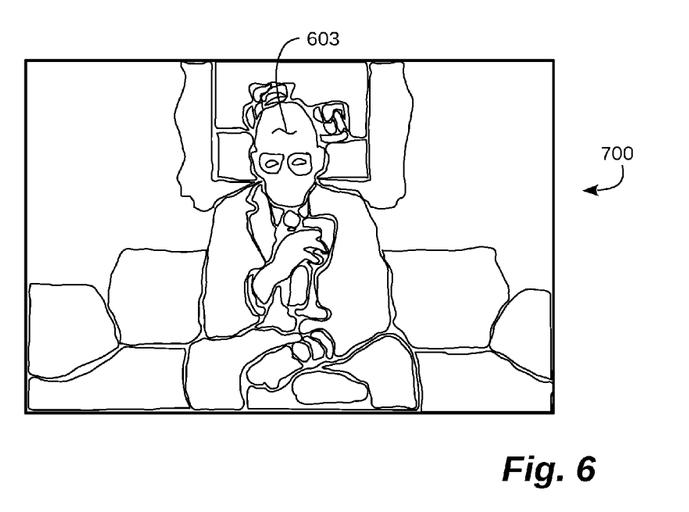

Turning briefly to FIGS. 5 and 6, a subject digital image 600 is shown. FIG. 5 shows a digital image 600 that captures a man sitting on a couch drinking wine from a wine glass. On the wall behind the man is a framed painting of two ships on the sea. The digital image 600 represents a common picture that may be captured. In FIG. 6, the digital image 600 has had a shape identification technique applied, resulting in processed image 700. Apparent in processed image 700 are very many unique shapes that approximately correspond to every distinguishable feature within digital image 600.

However, shape identification procedures generally distinguish shapes based on sharp variations and demarcations between items in the image. Shape identification does not associate two or more shapes that are, in concept, parts of what a human would view as the same object. For example, the man's head 603 in the processed image 700 has been identified as distinct from the man's body, which has itself been identified as having several different parts. Similarly, each portion of the couch has been identified as a distinct item. However, a human would consider all of the parts of the man as one object (a person) and all the constituent parts of the couch as one object (a couch). Accordingly, the object analysis engine 305 performs additional functions to determine if two or more shapes should actually be considered or treated as the same object.

In this particular implementation, the object analysis engine 305 may perform any one or more of several functional analyses, such as a baseline evaluation function 306, a color analysis function 308, a proximity evaluation function 310, or other functions. Specific implementations of each of those functions are described below. Generally stated, those functions analyze shapes within an image to determine whether characteristics of those shapes suggest that two or more shapes should be consolidated into one shape. Based on either human input, or automated analyses, or a combination of both, the object analysis engine 305 makes a determination of which shapes within a processed image represent parts of the same object.

An image analyzer 312 is also provided that includes functionality to analyze an image to discern characteristics of the image. For instance, the image analyzer 312 is configured to construct a histogram or histograms for the image to identify characteristics of each pixel or groups of pixels of the image. Examples of characteristics include, but are not limited to, color, brightness, contrast, saturation, color temperature, and the like. Further examples of characteristics may include associations between pixels and shapes, or pixels and objects, or associations between various shapes or objects, or the like. The image analyzer 312 may be further configured to store characteristics of an image, or the image itself, or both the image and its characteristics in a data store 314.

The data store 314 is any storage vehicle, such as a database or similar mechanism, that stores information. In one specific example, the data store may include non-volatile storage medium in which is stored images and/or characteristics of those images 316. Still further, the data store 314 may include other data about objects, such as information obtained from earlier analyses of images, from third-parties, or information discerned from either earlier analysis of images, from third parties, or any combination thereof. Information stored within data store 314 may be accessed, modified, deleted, and/or otherwise manipulated using a storage manager 313.

Briefly stated, the image processing components 300 can more easily identify and distinguish various shapes and objects within an image. In other words, when presented with a new image for which it is desired to identify objects, the image processing components 300 implement functions and operations that analytically group pixels into shapes, and consolidate shapes into objects.

Although any method for segmenting an image may be used that embodies the disclosed teachings, certain exemplary methods are provided below for illustration. However, these methods should not be viewed as limiting, and any alternative method for segmenting an image may be used without deviating from the spirit and scope of the disclosure.

Illustrative Processes for Shape Consolidation

The principles and concepts will now be generally described with reference to sample processes that may be implemented by a computing device, such as the computing device illustrated in FIG. 1, in certain embodiments. The processes may be implemented using computer-executable instructions in software or firmware, but may also be implemented in other ways, such as with programmable logic, electronic circuitry, or the like. These processes are not to be interpreted as exclusive of other embodiments, but rather are provided as illustrative only.

Figure 4:
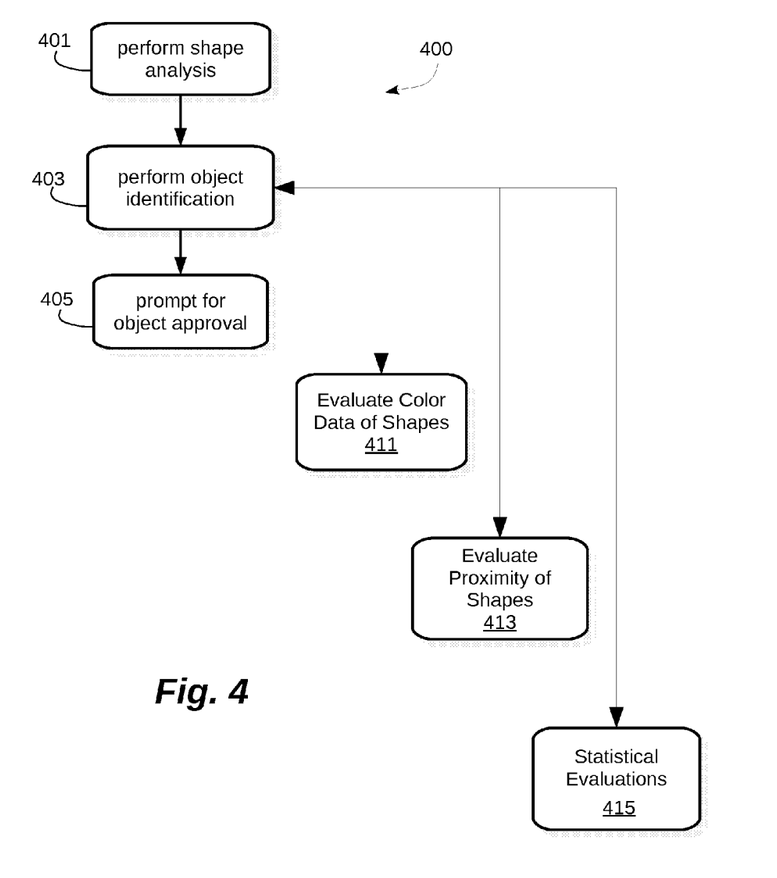
FIG. 4 is a flow diagram generally illustrating a basic process for implementing object identification in accordance with one embodiment.

FIG. 4 is a flow diagram generally illustrating one basic process 400 for implementing object identification in accordance with one embodiment. As illustrated in FIG. 4, the process 400 begins when a digital image is received which contains a number of pixels. In one example, the image may be of any scene that is composed of multiple objects, such as a person sitting on a couch or an object that a user desires to sell.

Turning again briefly to FIG. 5, the digital image 600 reflects a scene in which a man is sitting on a couch drinking wine from a wine glass. On the wall behind the man is a framed painting of two ships on the sea. The digital image 600 represents a common image that may be captured. However, this particular image is merely illustrative and any image displaying any scene may be analyzed using the disclosed techniques.

The process begins (Step 401) by performing a shape identification operation on the digital image. As mentioned above, any technique for identifying shapes within an image may be employed. In one implementation, the technique described in co-pending patent application Ser. No. 14/791,421 entitled "Shape Consolidation" and filed on Jul. 4, 2015 may be used, although any other technique for identifying shapes within a digital image may alternatively be used.

By way of illustration, performing a shape identification operation on the image 600 of FIG. 5 may result in the processed image 700 shown in FIG. 6. As shown in FIG. 6, the shape identification operation identifies many items within the image 600, typically by distinguishing between areas of the digital images that correspond to abrupt changes in color or texture or both. However, as will be understood by those skilled in the art, rarely does each separate shape represent what would be considered to be conceptual objects. For example, the man in image 600 would ordinarily be considered a single object, although he is represented by a large number of distinct shapes in processed image 700. Similarly, the couch captured in image 600 is represented by several distinct shapes in processed image 700. It is desirable to identify which shapes correspond to the same conceptual objects.

Returning to FIG. 4, the process continues by performing an object identification operation (Step 403) on the several shapes in processed image 700. Generally stated, the object identification operation performs one or more analyses on the several shapes of the processed image 700 for the purpose of identifying which shapes, if any, should be associated together as being constituent parts of the same object.

In one implementation, the object identification operation performs a color analysis 411 to identify which of the several shapes are sufficiently similar in either color, or texture, or combination of color and texture that the shapes should be considered parts of the same object. Importantly, the color analysis 411 does not merely evaluate adjacent shapes to determine if those shapes should be part of the same object. Rather, the color analysis 411 evaluates adjacent shapes as well as non-adjacent shapes for color and/or texture similarity.

In another implementation, the object identification operation performs a proximity analysis 413 to identify which of the several shapes are sufficiently proximate that they may be part of the same object. It should be observed that more than simple proximity should be considered. For example, proximate shapes that share a lengthy border may demonstrate characteristics that suggest they are part of the same object even though the coloring or texture may be dissimilar between the shapes.

In yet another implementation, the object identification operation performs a statistical analysis 415 based on a combination of the color analysis and the proximity analysis to identify objects. More specifically, the object identification may perform a combined analysis that assigns weights to various associations of shapes based on similarities in color and degree of proximity between the shapes. In other words, the more similar in color two shapes are, the less proximal in the image the two shapes need be before being considered parts of the same object. Conversely, two shapes that are immediately adjacent and demonstrate other indicia of similarity based on their proximity (e.g., sharing a completely coextensive distinct border) may be considered parts of the same object even though their colors differ by a greater degree than would otherwise suggest they be part of the same object.

Figure 7:
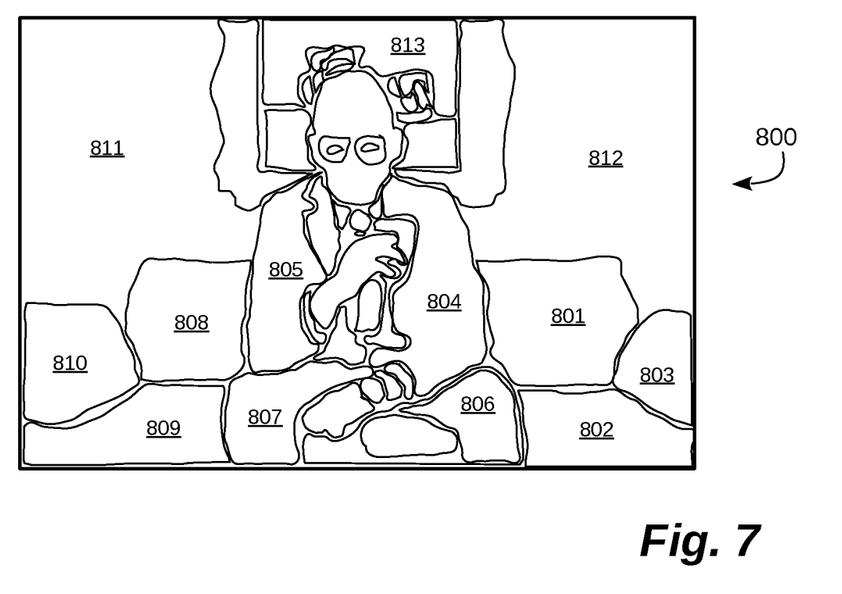

By way of illustration, and turning briefly to FIG. 7, each of the several shapes in the image 800 may be compared with other shapes in accordance with the above-teachings. For instance, shape 808 and shape 809 may be compared based on proximity or color or both to determine if those two shapes should be associated with the same object. In this example, shape 808 and shape 809 are both parts of the same couch, and accordingly are very similar in color and texture, in addition to being proximate. The same is true of shape 810. Accordingly, the analysis may recommend that shapes 808, 809, and 810 are all part of the same object. In addition, the same analysis achieves the same result regarding shapes 801, 802, and 803. Accordingly, the analysis recommends that shapes 801, 802, and 803 are all part of the same object. Still further, the analysis also determines that the group of shapes 808, 809, 810 is sufficiently similar in color and texture to the group of shapes 801, 802, 803 that both groups of shapes likely correspond to the same object even though the two shape groups are not proximate. Accordingly, the analysis may make the further recommendation that shapes 808, 809, 810 (Group I) and shapes 801, 802, 803 (Group II) are all part of the same object. The analysis may continue in this manner until all the shapes are analyzed, and a determination is made regarding which shapes should be recommended to which objects.

Returning to FIG. 4, the process continues by prompting for object approval (step 405). In one implementation, the process my present a user with one or more proposed object classifications of the digital image 600 and allow the user to select the one that most closely matches a desired result. Alternatively, the process may further enable the user to modify the object identifications by providing input or alterations to the recommended object identifications.

The evaluations just described represent merely a few illustrative evaluations that may be performed to help determine if two or more shapes are associated with the same object. It will be appreciated, based on the present teachings, that many other evaluations may also be performed. In addition, it should be appreciated that once two or more shapes are associated with the same object, the object may be further evaluated, such as to determine characteristics about the object that are not discernible from the image.

These and other uses and alternatives will become apparent from the foregoing teachings. Numerous details have been set forth in this description to provide a thorough understanding of the described embodiments. In other instances, well-known features have not been described in detail in order to not obscure unnecessarily the description.

A person skilled in the art in view of this description will be able to practice the present invention, which is to be taken as a whole. The specific embodiments disclosed and illustrated herein are not to be considered in a limiting sense. Indeed, it should be readily apparent to those skilled in the art that what is described herein may be modified in numerous ways. Such ways can include equivalents to what is described herein. In addition, the invention may be practiced in combination with other systems. The following claims define certain combinations and subcombinations of elements, features, steps, and/or functions, which are regarded as novel and non-obvious. Additional claims for other combinations and subcombinations may be presented in this or a related document.

The invention claimed is:

1. A method for consolidating shapes in a digital image, comprising:
    performing a shape identification analysis of pixels within the digital image to identify shapes within the digital image;
    analyzing each shape to identify attributes of each shape;
    comparing the identified attributes of each shape to the identified attributes of other shapes to determine if the shapes are sufficiently related to constitute an object, wherein the shapes are considered sufficiently related if differences between the identified attributes fall within a threshold of similarity; and
    if the identified attributes are sufficiently related, associating the shapes with each other to form an object within the digital image.

2. The method recited in claim 1, wherein each shape is analyzed without regard to whether the shapes are adjacent.

3. The method recited in claim 1, wherein the shape identification analysis implements a Canny algorithm operation to detect shapes.

4. The method recited in claim 1, wherein the shape identification analysis implements a differential approach to evaluate a rate of change of color across pixels in the digital image.

5. The method recited in claim 1, wherein the step of analyzing each shape comprises performing a color analysis to identify which of the several shapes are sufficiently similar in either color, or texture, or combination of color and texture that the shapes should be considered parts of the same object.

6. The method recited in claim 1, wherein the step of analyzing each shape comprises performing a proximity analysis to identify which of the several shapes are sufficiently proximate that they may be part of the same object.

7. The method recited in claim 1, wherein the step of analyzing each shape comprises:
    performing a color analysis to identify which of the several shapes are sufficiently similar in either color, or texture, or combination of color and texture that the shapes should be considered parts of the same object; and
    performing a proximity analysis to identify which of the several shapes are sufficiently proximate that they may be part of the same object.

8. The method recited in claim 7, wherein the step of comparing the identified attributes further comprises:
    performing a statistical analysis of the color analysis and the proximity analysis to identify whether similarities between the identified attributes of one or more shapes satisfy a threshold value.

9. The method recited in claim 8, wherein the statistical analysis assigns a first weighted value to the color analysis and a second weighted value to the proximity analysis, and further wherein the statistical analysis compares the first and second weighted values to determine if the shapes are sufficiently related.

10. A system for consolidating shapes in a digital image, comprising:
    a computer data store containing the digital image, the digital image being composed of a multiplicity of pixels; and a computing processor, coupled to the computer data store, the computing processor being programmed to perform, in no particular order, operations including to:

perform a shape identification analysis of the multiplicity of pixels within the digital image to identify shapes within the digital image;

analyze each shape to identify attributes of each shape;

compare the identified attributes of each shape to the identified attributes of other shapes to determine if the shapes are sufficiently related to constitute an object, wherein the shapes are considered sufficiently related if differences between the identified attributes fall within a threshold of similarity; and if the identified attributes are sufficiently related, associate the shapes with each other to form an object within the digital image.

11. The system recited in claim 10, wherein each shape is analyzed without regard to whether the shapes are adjacent.

12. The system recited in claim 10, wherein the shape identification analysis implements a Canny algorithm operation to detect shapes.

13. The system recited in claim 10, wherein the shape identification analysis implements a differential approach to evaluate a rate of change of color across pixels in the digital image.

14. The system recited in claim 10, wherein the operation of analyzing each shape comprises a color analysis operation to identify which of the several shapes are sufficiently similar in either color, or texture, or combination of color and texture that the shapes should be considered parts of the same object.

15. The system recited in claim 10, wherein the operation of analyzing each shape comprises a proximity analysis operation to identify which of the several shapes are sufficiently proximate that they may be part of the same object.

16. The system recited in claim 10, wherein the operation of analyzing each shape is further configured to:

perform a color analysis to identify which of the several shapes are sufficiently similar in either color, or texture, or combination of color and texture that the shapes should be considered parts of the same object; and perform a proximity analysis to identify which of the several shapes are sufficiently proximate that they may be part of the same object.

17. The system recited in claim 16, wherein the operation of comparing the identified attributes further comprises:

performing a statistical analysis of the color analysis and the proximity analysis to identify whether similarities between the identified attributes of one or more shapes satisfy a threshold value.

18. The system recited in claim 17, wherein the statistical analysis assigns a first weighted value to the color analysis and a second weighted value to the proximity analysis, and further wherein the statistical analysis compares the first and second weighted values to determine if the shapes are sufficiently related.

* * * * *